US008183307B2

(12) United States Patent
Prasse

(10) Patent No.: US 8,183,307 B2
(45) Date of Patent: May 22, 2012

(54) CROSSLINKABLE SUBSTANCES BASED ON ORGANOSILICON COMPOUNDS

(75) Inventor: Marko Prasse, Glaubitz (DE)

(73) Assignee: Wacker Chemie AG, Munich (DE)

( * ) Notice: Subject to any disclaimer, the term of this patent is extended or adjusted under 35 U.S.C. 154(b) by 200 days.

(21) Appl. No.: 11/782,711

(22) Filed: Jul. 25, 2007

(65) Prior Publication Data

US 2008/0033074 A1 Feb. 7, 2008

(30) Foreign Application Priority Data

Aug. 4, 2006 (DE) .................. 10 2006 036 556

(51) Int. Cl.
| C09D 5/16 | (2006.01) |
| C08K 9/00 | (2006.01) |
| C08K 9/10 | (2006.01) |
| C08K 9/12 | (2006.01) |
| C08K 5/00 | (2006.01) |
| C08K 5/16 | (2006.01) |
| B32B 7/12 | (2006.01) |

(52) U.S. Cl. .......... 523/122; 523/210; 523/205; 524/83; 524/186

(58) Field of Classification Search .......... 524/83, 524/186; 523/122, 205, 210
See application file for complete search history.

(56) References Cited

U.S. PATENT DOCUMENTS

| 5,534,563 | A | 7/1996 | Lin et al. | |
| 6,121,298 | A | 9/2000 | Sakamoto et al. | |
| 6,291,549 | B1 * | 9/2001 | Mechtel et al. | 523/122 |
| 6,365,066 | B1 | 4/2002 | Podszun et al. | |
| 6,610,282 | B1 * | 8/2003 | Ghosh | 424/78.09 |
| 6,740,692 | B2 | 5/2004 | Weitzel et al. | |
| 7,033,673 | B2 | 4/2006 | Wiedemann et al. | |
| 2004/0234603 | A1 * | 11/2004 | Baum et al. | 424/486 |
| 2004/0266967 | A1 * | 12/2004 | Ziche | 528/18 |
| 2006/0063001 | A1 * | 3/2006 | Hart et al. | 428/402.2 |
| 2006/0210525 | A1 | 9/2006 | Linnhoff et al. | |
| 2006/0254468 | A1 | 11/2006 | Bastelberger et al. | |

FOREIGN PATENT DOCUMENTS

| CN | 1114525 C | 7/2003 |
| DE | 196 44 224 A1 | 4/1998 |
| DE | 103 23 205 A1 | 12/2004 |
| DE | 103 59 703 A1 | 7/2005 |
| EP | 0679333 A2 | 11/1995 |
| EP | 679333 A2 * | 11/1995 |
| EP | 0 897 666 A1 | 2/1999 |
| EP | 0 922 386 A2 | 6/1999 |
| EP | 0 931 811 A1 | 7/1999 |
| EP | 931811 A1 * | 7/1999 |
| EP | 0 954 965 A1 | 11/1999 |
| EP | 0 954 966 A1 | 11/1999 |
| EP | 1 273 638 A1 | 1/2003 |
| EP | 1 614 723 A1 | 1/2006 |
| JP | 60008219 A | 1/1985 |
| JP | 60008219 A | 7/1985 |
| JP | 3145404 A | 6/1991 |
| JP | 5056836 A | 3/1993 |
| JP | 6084417 A | 3/1994 |
| JP | 8295353 A | 11/1996 |
| JP | 2001502732 T | 2/2001 |
| JP | 2001502733 T | 2/2001 |
| JP | 2001502733 T | 2/2007 |
| WO | 95/32240 A1 | 11/1995 |
| WO | 2004000953 A1 | 12/2003 |
| WO | 2005/032245 A1 | 4/2005 |

OTHER PUBLICATIONS

Edge, M., Seal, K., Allen, N.S., Turner, D., Robinson, J. "The Enhanced Performance of Biocidal Additives in Paints and Coatings." Industrial Biocides: Selection and Application. Eds. D.R. Karsa, D. Ashworth. Cambridge: The Royal Society and Chemistry, 2002. 84-94. Print.*
US 6,365,066 B1 is corresponding to DE 196 44 224 A1.
US 2006/0210525 A1 is corresponding to EP 1 614 723 A1.
US 2006/0254468 A1 corresponds to DE 103 23 205 A1.
US 6,740,692 B2 corresponds to EP 1 273 638 A1.
Dale Flackett, "One Part Silicone Sealants", Gelest, Inc., FlackTec Inc., Landrum, SC 29356, U.S.A.
Kathon (TM) 287 PXE Microbicide for Silicone Sealants, Rohm and Haas, Nov. 2005.
Francois De Buyl, "Silicone sealants and structural adhesives", International Journal of Adhesion & Adhesives 21 (2001) 411-422, pp. 411-422.
Andreas T. Wolf Editor, "Durability of Building and Construction Sealants and Adhesives," ASTM, 2004, ISBN 0-8031-3480-0, Francois de Buyl et al., Insights into the Use of Biocides in Silicone Sealants: Test Methods and Durability Aspects, 228-251.
Kirk Othmer, Encyclopedia of Chemical Technology, "Silicon Compounds to Succinic Acid and Succinic Anhydride", Fourth Edition, vol. 22, (1997), 119, 120.
T. Gosh, E.N. Nungesser, "Controlling the Release of Isothiazolone Biocides," Proceed. Int'l. Symp. Control Rel. Bioact. Mater, 25, (1998) 324, 325.
Wilfried Paulus, "Microbicides for the Protection of Materials," A Handbook, Ed., Chapman & Hall, First edition (1993) 300, 301, 324-331.
Plastics Additives Handbook, Edited by Gächter and Müller, 4th Edition (Spring 1993), p. 792.

* cited by examiner

Primary Examiner — Katarzyna Wyrozebski Lee
Assistant Examiner — Anthony H Sheh
(74) Attorney, Agent, or Firm — Brooks Kushman P.C.

(57) ABSTRACT

Crosslinkable substances based on organosilicon compounds contain encapsulated biocides which maintain their effectiveness for extended periods.

19 Claims, No Drawings

CROSSLINKABLE SUBSTANCES BASED ON ORGANOSILICON COMPOUNDS

BACKGROUND OF THE INVENTION

1. Field of the Invention

The invention relates to crosslinkable substances based on organosilicon compounds and comprising encapsulated biocides, to processes for the preparation thereof and to the use thereof.

2. Background Art

Single-component sealants which are storable with the exclusion of water and which vulcanize on exposure to water at ambient temperature to give elastomers are well known. These products are used in large amounts, for example in the construction industry. Growth of organisms such as fungi and algae readily occur on the surface of the sealants, in particular in surroundings of high atmospheric humidity, for example in bathrooms or kitchens, but also, for example, in tropical regions. In order to prevent this growth, fungicides or biocides are added to the sealants.

However, the use of many biocides in pure form is problematic since interactions with other ingredients may occur, for example with amine adhesion promoters, and may result in discolorations, vulcanization problems and reduced effectiveness, e.g. reduced fungicidal effectiveness.

The biocides must be able to diffuse to the surface in order to be able to act in that vicinity. This diffusion is thus associated with fairly rapid leaching of the active substance and accordingly a fairly rapid loss of biocidal effectiveness. If an attempt is made to counteract this by a high concentration of the free active substance, this generally results in ecological problems and also in increased product cost.

Furthermore, some biocides can only be used with UV stabilizers. A mixture of free active substance and UV stabilizer in the composition does not, however, effectively prevent the decomposition of the active substance by UV light during storage.

SUMMARY OF THE INVENTION

It has now been surprisingly discovered that the abovementioned problems can be solved through the use of encapsulated biocides in sealant formulations so that no discolorations occur and an unusually lengthy biocidal activity can be achieved. One aspect of the present invention therefore pertains to crosslinkable compositions based on organosilicon compounds which comprise encapsulated biocides. The crosslinkable compositions are preferably substances which can be crosslinked by a condensation reaction, which, in the context of the present invention, "condensation reaction" also encompass an optionally preceding hydrolysis stage, and "condensable radicals" also encompasses radicals which are subject to an optionally preceding hydrolysis stage.

DETAILED DESCRIPTION OF THE PREFERRED EMBODIMENT(S)

The compositions according to the invention are most preferably those which can be prepared by use of (A) organosilicon compound(s) with at least two condensable groups, (B) encapsulated biocides, optionally (C) crosslinking agent(s) and, optionally (D) compounds exhibiting basic nitrogen.

The organosilicon compounds which participate in the crosslinking reaction may possess any condensable groups, such as hydroxyl, oximato, acetoxy and organyloxy groups, in particular alkoxy radicals such as ethoxy radicals, alkoxyethoxy radicals and methoxy radicals.

The organosilicon compounds (A) can be any organosilicon compounds with at least two condensable groups on average which are useful in compositions crosslinkable by the condensation reaction. In this connection, both pure siloxanes, thus ≡Si—O—Si≡ structures, and silcarbanes, thus ≡Si—R″—Si≡ structures with R″ being a divalent hydrocarbon radical optionally substituted by or interrupted by heteroatoms, or any copolymer bearing condensable organosilicon groups, may be used.

The organosilicon compounds (A) are preferably those comprising units of the formula

$$R_a(OR^1)_b Y_c SiO_{(4-a-b-c)/2} \quad (I),$$

in which

R can be identical or different and represents optionally substituted hydrocarbon radicals which can be interrupted by oxygen atoms, $R^1$ can be identical or different and represents a hydrogen atom or monovalent optionally substituted hydrocarbon radical which can be interrupted by oxygen atoms, Y can be identical or different and represents a halogen atom, a pseudohalogen radical, an Si—N-bonded amine radical, an amide radical, an oxime radical or an aminoxy radical, a is 0, 1, 2 or 3, preferably 1 or 2, b is 0, 1, 2 or 3, preferably 0, 1 or 2, more preferably 0, and c is 0, 1, 2 or 3, preferably 0 or 1, and more preferably 0, with the proviso that the sum of a+b+c is less than or equal to 4 and at least two condensable radicals ($OR^1$) are present per molecule. Preferably, the sum a+b+c is less than or equal to 3.

Radical R is preferably a monovalent hydrocarbon radical with 1 to 18 carbon atoms, optionally substituted by halogen atoms, amino groups, ether groups, ester groups, epoxy groups, mercapto groups, cyano groups or (poly)glycol radicals, the latter being formed from oxyethylene and/or oxypropylene units, more preferably alkyl radicals with 1 to 12 carbon atoms, and in particular the methyl radical. Radical R can, however, also be a divalent radical which, e.g., bonds two silyl groups to one another.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals, such as the o-, m- and p-tolyl radicals, xylyl radicals and ethylphenyl radicals; and aralkyl radicals such as the benzyl radical, and the α-phenylethyl and β-phenylethyl radicals.

Examples of substituted radicals R are the methoxyethyl, the ethoxyethyl and the ethoxyethoxyethyl radicals, while examples of divalent radicals R are polyisobutylenediyl radicals and propanediyl-terminated polypropylene glycol radicals.

Examples of radicals $R^1$ are the monovalent radicals given for R. The radical $R^1$ is preferably a hydrogen atom or an alkyl radical with 1 to 12 carbon atoms, more preferably the hydrogen atom, a methyl radical or an ethyl radical, and in particular the hydrogen atom.

Examples of radicals Y are the dimethylamino, cyclohexylamino and methylethylketoximo radicals.

Organosilicon compounds (A) are more preferably those of the formula $$(OR^1)_{3-f}R_f Si—(SiR_2—O)_e—SiR_f(OR^1)_{3-f} \quad (II),$$

in which

R and $R^1$ have one of the meanings given above, e is equal to 30 to 3000 and f is equal to 1 or 2. Preferably, f is equal to 2 if $R^1$ is a hydrogen atom, and f is equal to 1 if $R^1$ is other than a hydrogen atom.

Examples of organosilicon compounds (A) are
$(MeO)_2MeSiO[SiMe_2O]_{200-2000}SiMe(OMe)_2$,
$(HO)Me_2SiO[SiMe_2O]_{200-2000}SiMe_2(OH)$,
$(EtO)_2MeSiO[SiMe_2O]_{200-2000}SiMe(OEt)_2$,
$(HO)MeViSiO[SiMe_2O]_{200-2000}SiMeVi(OH)$,
$(MeO)_2ViSiO[SiMe_2O]_{200-2000}SiVi(OMe)_2$ and
$(EtO)_2ViSiO[SiMe_2O]_{200-2000}SiVi(OEt)_2$, Me representing the methyl radical, Et representing the ethyl radical and Vi representing the vinyl radical.

The organosilicon compounds (A) used according to the invention preferably have a viscosity of preferably 100 to $10^6$ mPa·s, more preferably of $10^3$ to 350,000 mPa·s, in each case at 25° C., and are commercially available products or can be prepared according to methods common in silicon chemistry.

The term "biocides" is understood to mean, in the context of this invention, bactericides, fungicides and algicides, and the like. The biocides of the component (B) used according to the invention are preferably methyl benzimidazol-2-ylcarbamate (carbendazim), 10,10'-oxybisphenoxarsine, 2-(4-thiazolyl)-benzimidazole, N-(fluorodichloromethylthio)phthalimide, diiodomethyl p-tolyl sulfone, if appropriate in combination with a UV stabilizer, such as 2,6-di(tert-butyl)-p-cresol, 3-iodo-2-propinyl butylcarbamate (IPBC), zinc 2-pyridinethiol 1-oxide, triazolyl compounds such as α-[2-(4-chlorophenyl)ethyl]-α-(1,1-dimethylethyl)-1H-1,2,4-triazole-1-ethanol (tebuconazole), 3-(benzo[b]thien-2-yl)-5,6-dihydro-1,4,2-oxathiazine 4-oxide and benzothiophene-2-cyclohexylcarboxamide S,S-dioxide, and also isothiazolinones, such as 4,5-dichloro-2-(n-octyl)-4-isothiazolin-3-one (DCOIT), 2-(n-octyl)-4-isothiazolin-3-one (OIT) and n-butyl-1,2-benzisothiazolin-3-one (BBIT).

The biocides of the component (B) are more preferably 2-(4-thiazolyl)-benzimidazole, N-(fluorodichloromethylthio)phthalimide, diiodomethyl p-tolyl sulfone, if appropriate in combination with a UV stabilizer, such as, e.g., 2,6-di(tert-butyl)-p-cresol, 3-iodo-2-propinyl butylcarbamate (IPBC), zinc 2-pyridinethiol 1-oxide and benzothiophene-2-cyclohexylcarboxamide S,S-dioxide, and also isothiazolinones, such as 4,5-dichloro-2-(n-octyl)-4-isothiazolin-3-one (DCOIT), 2-(n-octyl)-4-isothiazolin-3-one (OIT) and n-butyl-1,2-benzisothiazolin-3-one (BBIT), in particular 2-(n-octyl)-4-isothiazolin-3-one (OIT) and 4,5-dichloro-2-(n-octyl)-4-isothiazolin-3-one (DCOIT).

The biocidal active substances which comprises component (B) are commercially available products or can be prepared according to methods common in organic chemistry. Component (B) is preferably a finely divided substance which is solid at ambient temperature and atmospheric pressure and which preferably has a mean particle diameter of less than 20 µm, more preferably 0.1 to 20 µm, and especially 0.2 to 10 µm. The biocides may have a polar interaction with the carrier material, with diffusion from the carrier material being possible. The structure of the biocide is preferably unchanged after leaving the carrier material.

The component (B) can be prepared according to any useful process therefor. Use may be made, as encapsulating material, of the conventional polymers and porous materials corresponding to the state of the art. Examples of encapsulating materials and techniques are found, for example, in WO 2004/000953 A1 and in DE-A 10359703, which are merely incorporated by reference. Use may also be made, as encapsulating material, of cyclic compounds such as macrocycles of polyethylene glycol (crown ethers) or polypropylene glycol, which can, if appropriate, be modified, or cyclodextrins such as those which are available commercially under the Cavamax® or Cavasol® brand from Wacker Chemie AG. Examples with regard to the latter are found in EP-A 1 273 638, which is incorporated herein by reference. The encapsulating material has to be sufficiently stable towards shearing and UV radiation.

Component (B) preferably does not contain water. If the encapsulated active substances (B) contain water after their preparation, they are preferably dried as thoroughly as possible before use. Drying can be carried out according to known processes, for example by means of fluid bed drying, freeze drying or spray drying, if appropriate after addition of protective colloids as an atomizing aid. If component (B) is prepared as an aqueous dispersion, these are preferably spray dried. The spray drying is in this connection carried out in conventional spray drying units, it being possible for the atomization to be carried out using single-component, two-component or multicomponent nozzles or with a rotating disk. The outlet temperature is generally chosen in the range from 45° C. to 120° C., preferably 60° C. to 90° C., depending on the plant, Tg of the resin, and degree of drying desired.

If the carrier material is a polymer, the atomizing aid is generally used in a total amount of 3 to 30% by weight, based on the polymer constituents of the dispersion, that is the total amount of protective colloid before the drying operation should be at least 3 to 30% by weight, based on the polymer portion. Use is preferably made of 5 to 20% by weight of protective colloid, based on the polymer portion.

Suitable atomizing aids are protective colloids such as partially saponified or completely saponified polyvinyl alcohols; polyvinylpyrrolidones; polyvinyl acetals; polysaccharides in water-soluble form such as starches (amylose and amylopectin), celluloses and the carboxymethyl, methyl, hydroxyethyl or hydroxypropyl derivatives thereof; proteins such as casein or caseinate, soy protein or gelatin; lignosulfonates; synthetic polymers such as poly(meth)acrylic acid, copolymers of (meth)acrylates with carboxyl-functional comonomer units, poly(meth)acrylamide, polyvinylsulfonic acids and the water-soluble copolymers thereof; melamine formaldehyde sulfonate, naphthalene formaldehyde sulfonate, styrene/maleic acid and vinyl ether/maleic acid copolymers.

A content of up to 1.5% by weight of antifoaming agent, based on the base polymer, has in many cases proved to be convenient in atomizing. In order to increase the shelf life by improving the blocking stability, in particular in powders with a low glass transition temperature, the powder obtained can be furnished with an antiblocking agent (anticaking agent), preferably up to 30% by weight, based on the total weight of the polymer constituents. Examples of antiblocking agents are calcium or magnesium carbonate, talc, gypsum, silica, kaolins or silicates, preferably with particle sizes in the range from 10 nm to 10 µm.

In order to render the compositions hydrophobic, the dispersions can, before drying, also be treated with one or more hydrophobizing agents from the group consisting of fatty acids, fatty acid derivatives, and organosilicon compounds. Compounds suitable for this are listed, for example, in DE-A 10323205.

The viscosity of the feed to be atomized is adjusted via the solids content so that a value of <500 mPa·s (Brookfield viscosity at 20 revolutions and 23° C.), preferably <250 mPa·s, is obtained. The solids content of the dispersion to be atomized is >35% by weight, preferably >40% by weight.

The active substance content of the dried component B is from 40 to 80% by weight, preferably from 50 to 75% by weight, and depends on the encapsulating agent chosen and the auxiliaries.

The component (B) according to the invention preferably are dry powders which are used in this form, or if desired, are made into a paste with inert oils such as, e.g., silicone oils, polyethers or high boiling point hydrocarbons, with or without thickeners such as reinforcing fillers or pyrogenic silicas, and, if appropriate, with additional fillers, such as, e.g., calcium carbonate or barium sulfate, with particle sizes preferably in the range from 10 nm to 10 µm. The compositions (B) used according to the invention can have a pasty and rigid, to liquid and pumpable, consistency.

The active substance content (content of pure biocide) in the compositions is preferably from 2 to 50% by weight, more preferably from 3 to 40% by weight. The composition of the invention thus preferably contain component (B) in amounts from preferably 0.01 to 3 parts by weight, more preferably from 0.1 to 1 part by weight, and in particular from 0.2 to 0.4 part by weight, in each case based on 100 parts by weight of organosilicon compound (A).

The crosslinking agents (C) optionally used in the inventive compositions may be any crosslinking agent with at least three condensable radicals, such as, for example, silanes or siloxanes with at least three organyloxy groups. The crosslinking agents (C) are preferably organosilicon compounds of the formula $$(R^5O)_d Z_g SiR^4_{(4-d-g)} \quad (III),$$

in which
R$^4$ can be identical or different and are monovalent, optionally substituted, hydrocarbon radicals which can be interrupted by oxygen atoms,
R$^5$ can be identical or different and has a meaning mentioned above for R$^1$,
Z can be identical or different and has a meaning given for Y,
d is 0, 1, 2, 3 or 4, preferably 2 or 3, more preferably 3, and
g is 0, 1, 2, 3 or 4, preferably 0 or 3, more preferably 0,
with the proviso that the sum d+g is equal to 3 or 4,
and also the partial hydrolysates thereof. In this connection, the partial hydrolysates can be partial homohydrolysates, i.e. partial hydrolysates of a single type of organosilicon compound of the formula (III), and also partial cohydrolysates, i.e. partial hydrolysates of at least two different types of organosilicon compounds of the formula (III). If the crosslinking agent (C) is a partial hydrolysate of organosilicon compounds of the formula (III), those partial hydrolysates with up to 6 silicon atoms are preferred.

Examples of radical R$^5$ are the examples mentioned above for radical R$^1$. Radical R$^6$ is preferably a hydrogen atom or alkyl radical, more preferably a hydrogen atom or an alkyl radical with 1 to 4 carbon atoms, and in particular the hydrogen atom, the methyl radical and the ethyl radical.

Examples of radical R$^4$ are the monovalent examples mentioned above for radical R, hydrocarbon radicals with 1 to 12 carbon atoms being preferred and the methyl radical and the vinyl radical being particularly preferred.

Examples of Z are the examples given for Y, methylethylketoximo radicals being preferred.

The optional crosslinking agents (C) are more preferably tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 3-cyanopropyltrimethoxysilane, 3-cyanopropyltriethoxysilane, 3-(glycidoxy)propyltriethoxysilane, 1,2-bis(trimethoxysilyl)ethane, 1,2-bis(triethoxysilyl)ethane, methyltris(methylethylketoximo)silane, vinyltris(methylethylketoximo)silane, tetrakis(methylethylketoximo)silane and also partial hydrolysates of the organosilicon compounds mentioned, such as, e.g. hexaethoxydisiloxane. The crosslinking agents (C) are commercially available products or can be prepared according to processes known in silicon chemistry.

If the compositions according to the invention contain a crosslinking agent (C), the amount is preferably from 0.01 to 20 parts by weight, more preferably from 0.5 to 10 parts by weight, and in particular from 1.0 to 5.0 parts by weight, in each case based on 100 parts by weight of organosilicon compound (A).

The compounds (D) exhibiting basic nitrogen optionally used in the compositions of the invention are preferably those chosen from the group consisting of compounds of the formula $$NR^6_3 \quad (IV)$$

in which R$^6$ can be identical or different and represents a hydrogen atom or hydrocarbon radical optionally substituted by hydroxyl groups, halogen atoms, amino groups, ether groups, ester groups, epoxy groups, mercapto groups, cyano groups or (poly)glycol radicals, the latter being formed from oxyethylene and/or oxypropylene units,
with the proviso that, in formula (IV), at most two R$^6$ are a hydrogen atom, cyclic aliphatic amines, such as, for example, piperidine and morpholine, and also organosilicon compounds with at least one organic radical exhibiting basic nitrogen of units of formula $$R^7_k A_l Si(OR^8)_m O_{(4-k-l-m)/2} \quad (V),$$

in which
R$^7$ can be identical or different and are monovalent SiC-bonded organic radicals which do not contain basic nitrogen,
R$^8$ can be identical or different and has a meaning given for radical R$^1$,
A can be identical or different and represents a monovalent SiC-bonded radical with basic nitrogen,
k is 0, 1, 2 or 3,
l is 0, 1, 2, 3 or 4 and
m is 0, 1, 2 or 3,
with the proviso that the sum of k+l+m is less than or equal to 4 and at least one radical A is present per molecule.

Examples of radical R$^6$ and R$^7$ are, in each case independently of one another, the examples given for R for optionally substituted hydrocarbon radicals. The optionally substituted hydrocarbon radicals R$^6$ are preferably those with 1 to 18 carbon atoms. Radicals R$^7$ are preferably hydrocarbon radicals with 1 to 18 carbon atoms, the methyl radical, the ethyl radical and the n-propyl radical being particularly preferred, especially the methyl radical.

Examples of radical R$^8$ are the examples given for radical R$^1$. Radical R$^8$ is preferably the hydrogen atom, the methyl radical and the ethyl radical.

Examples of radicals A are radicals of the formulae $H_2NCH_2$—, $H_2N(CH_2)_2$—, $H_2N(CH_2)_3$—, $H_2N(CH_2)_2NH$ (CH$_2$)$_2$—, H$_2$N(CH$_2$)$_2$NH(CH$_2$)$_3$—, H$_2$N(CH$_2$)$_2$NH(CH$_2$)$_2$NH(CH$_2$)$_3$—, H$_3$CNH(CH$_2$)$_3$—, C$_2$H$_5$NH(CH$_2$)$_3$—, H$_3$CNH(CH$_2$)$_2$—, C$_2$H$_5$NH(CH$_2$)$_2$—, H$_2$N(CH$_2$)$_4$—, H$_2$N(CH$_2$)$_5$—, H(NHCH$_2$CH$_2$)$_3$—, C$_4$H$_9$NH(CH$_2$)$_2$NH(CH$_2$)$_2$—, cyclo-C$_6$H$_{11}$NH(CH$_2$)$_3$—, cyclo-C$_6$H$_{11}$NH(CH$_2$)$_2$—, (CH$_3$)$_2$N(CH$_2$)$_3$—, (CH$_3$)$_2$N(CH$_2$)$_2$—, (C$_2$H$_5$)$_2$N(CH$_2$)$_3$- and (C$_2$H$_5$)$_2$N(CH$_2$)$_2$—, A is preferably a H$_2$N(CH$_2$)$_3$—, H$_2$N(CH$_2$)$_2$NH(CH$_2$)$_3$—, H$_3$CNH(CH$_2$)$_3$—, C$_2$H$_5$NH(CH$_2$)$_3$— and cyclo-C$_6$H$_{11}$NH(CH$_2$)$_3$ radical, the H$_2$N(CH$_2$)$_2$NH(CH$_2$)$_3$—, radical and the cyclo-C$_6$H$_{11}$NH(CH$_2$)$_3$ radical being particularly preferred.

If the organosilicon compounds of units of the formula (V) are silanes, then k is preferably 0, 1 or 2, more preferably 0 or 1, l is preferably 1 or 2, more preferably 1, and m is preferably 1, 2 or 3, more preferably 2 or 3, with the proviso that the sum of k+l+m is equal to 4.

Examples of the silanes of the formula (V) optionally used according to the invention are H$_2$N(CH$_2$)$_3$—Si(OCH$_3$)$_3$, H$_2$N(CH$_2$)$_3$—Si(OC$_2$H$_5$)$_3$, H$_2$N(CH$_2$)$_3$—Si(OCH$_3$)$_2$CH$_3$, H$_2$N(CH$_2$)$_3$—Si(OC$_2$H$_5$)$_2$CH$_3$, H$_2$N(CH$_2$)$_2$NH(CH$_2$)$_3$—Si(OCH$_3$)$_3$, H$_2$N(CH$_2$)$_2$NH(CH$_2$)$_3$—Si(OC$_2$H$_5$)$_3$, H$_2$N(CH$_2$)$_2$NH(CH$_2$)$_3$—Si(OCH$_3$)$_2$CH$_3$, H$_2$N(CH$_2$)$_2$NH(CH$_2$)$_3$—Si(OC$_2$H$_5$)$_2$CH$_3$, H$_2$N(CH$_2$)$_2$NH(CH$_2$)$_3$—Si(OH)$_3$, H$_2$N(CH$_2$)$_2$NH(CH$_2$)$_3$—Si(OH)$_2$CH$_3$, H$_2$N(CH$_2$)$_2$NH(CH$_2$)$_2$NH(CH$_2$)$_3$—Si(OCH$_3$)$_3$, H$_2$N(CH$_2$)$_2$NH(CH$_2$)$_2$NH(CH$_2$)$_3$—Si(OC$_2$H$_5$)$_3$, cyclo-C$_6$H$_{11}$NH(CH$_2$)$_3$—Si(OCH$_3$)$_3$, cyclo-C$_6$H$_{11}$NH(CH$_2$)$_3$—Si(OC$_2$H$_5$)$_3$, cyclo-C$_6$H$_{11}$NH(CH$_2$)$_3$—Si(OCH$_3$)$_2$CH$_3$, cyclo-C$_6$H$_{11}$NH(CH$_2$)$_3$—Si(OC$_2$H$_5$)$_2$CH$_3$, cyclo-C$_6$H$_{11}$NH(CH$_2$)$_3$—Si(OH)$_3$, cyclo-C$_6$H$_{11}$NH(CH$_2$)$_3$—Si(OH)$_2$CH$_3$, HN((CH$_2$)$_3$—Si(OCH$_3$)$_3$)$_2$ and HN((CH$_2$)$_3$—Si(OC$_2$H$_5$)$_3$)$_2$ and also the part hydrolysates thereof, H$_2$N(CH$_2$)$_2$NH(CH$_2$)$_3$—Si(OCH$_3$)$_3$, H$_2$N(CH$_2$)$_2$NH(CH$_2$)$_3$—Si(OC$_2$H$_5$)$_3$, H$_2$N(CH$_2$)$_2$NH(CH$_2$)$_3$—Si(OCH$_3$)$_2$CH$_3$, H$_2$N(CH$_2$)$_2$NH(CH$_2$)$_3$—Si(OC$_2$H$_5$)$_2$CH$_3$, H$_2$N(CH$_2$)$_2$NH(CH$_2$)$_3$—Si(OC)$_3$, H$_2$N(CH$_2$)$_2$NH(CH$_2$)$_3$—Si(OH)$_2$CH$_3$, cyclo-C$_6$H$_{11}$NH(CH$_2$)$_3$—Si(OCH$_3$)$_3$, cyclo-C$_6$H$_{11}$NH(CH$_2$)$_3$—Si(OC$_2$H$_5$)$_3$, cyclo-C$_6$H$_{11}$NH(CH$_2$)$_3$—Si(OCH$_3$)$_2$CH$_3$, cyclo-C$_6$H$_{11}$NH(CH$_2$)$_3$—Si(OC$_2$H$_5$)$_2$CH$_3$, cyclo-C$_6$H$_{11}$NH(CH$_2$)$_3$—Si(OH)$_3$ and also cyclo-C$_6$H$_{11}$NH(CH$_2$)$_3$—Si(OH)$_2$CH$_3$ being preferred and H$_2$N(CH$_2$)$_2$NH(CH$_2$)$_3$—Si(OCH$_3$)$_3$, H$_2$N(CH$_2$)$_2$NH(CH$_2$)$_3$—Si(OCH$_3$)$_2$CH$_3$, cyclo-C$_6$H$_{11}$NH(CH$_2$)$_3$—Si(OCH$_3$)$_3$, cyclo-C$_6$H$_{11}$NH(CH$_2$)$_3$—Si(OCH$_3$)$_2$CH$_3$, H$_2$N(CH$_2$)$_2$NH(CH$_2$)$_3$—Si(OH)$_3$ and H$_2$N(CH$_2$)$_2$NH(CH$_2$)$_3$—Si(OH)$_2$CH$_3$, and also in each case the partial hydrolysates thereof, being particularly preferred.

If the organosilicon compounds of units of the formula (V) are organopolysiloxanes, the average value of k is preferably between 0.5 and 2.5, more preferably between 1.4 and 2.0, the average value of l is preferably between 0.01 and 1.0, more preferably between 0.01 and 0.6, and the average value of m is preferably between 0 and 2.0, more preferably between 0 and 0.2, with the proviso that the sum of k, l and m is less than or equal to 3.

The organopolysiloxanes of units of the formula (V) which can be used according to the invention preferably have a viscosity at 25° C. from 5 to 105 mPa·s, more preferably from 10 to 10$^4$ mPa·s.

Examples of the organopolysiloxanes of units of the formula (V) which can be used according to the invention are
H$_2$N(CH$_2$)$_3$—Si(OCH$_3$)$_2$—O—Si(CH$_3$)(OCH$_3$)$_2$,
H$_2$N(CH$_2$)$_3$—Si(OC$_2$H$_5$)$_2$—O—Si(CH$_3$)(OCH$_3$)$_2$,
H$_2$N(CH$_2$)$_3$—Si(OC$_2$H$_5$)$_2$—O—Si(CH$_3$)(OC$_2$H$_5$)$_2$,
H$_2$N(CH$_2$)$_3$—Si(OCH$_3$)(CH$_3$)—O—Si(CH$_3$)(OCH$_3$)$_2$,
H$_2$N(CH$_2$)$_3$—Si(OCH$_3$)(CH$_3$)—O—Si(OCH$_3$)$_3$,
H$_2$N(CH$_2$)$_3$—Si(OC$_2$H$_5$)(CH$_3$)—O—Si(OCH$_3$)$_3$,
H$_2$N(CH$_2$)$_2$NH(CH$_2$)$_3$—Si(OCH$_3$)$_2$—O—Si(CH$_3$)(OCH$_3$)$_2$,
H$_2$N(CH$_2$)$_2$NH(CH$_2$)$_3$—Si(OC$_2$H$_5$)$_2$—O—Si(CH$_3$)(OCH$_3$)$_2$,
H$_2$N(CH$_2$)$_2$NH(CH$_2$)$_3$—Si(OC$_2$H$_5$)$_2$—O—Si(CH$_3$)(OC$_2$H$_5$)$_2$,
H$_2$N(CH$_2$)$_2$NH(CH$_2$)$_3$—Si(OCH$_3$)(CH$_3$)—O—Si(CH$_3$)(OCH$_3$)$_2$,
H$_2$N(CH$_2$)$_2$NH(CH$_2$)$_3$—Si(OCH$_3$)(CH$_3$)—O—Si(OCH$_3$)$_3$,
H$_2$N(CH$_2$)$_2$NH(CH$_2$)$_3$—Si(OC$_2$H$_5$)(CH$_3$)—O—Si(OCH$_3$)$_3$,
cyclo-C$_6$H$_{11}$NH(CH$_2$)$_3$—Si(OCH$_3$)$_2$—O—Si(CH$_3$)(OCH$_3$)$_2$,
cyclo-C$_6$H$_{11}$NH(CH$_2$)$_3$—Si(OC$_2$H$_5$)$_2$—O—Si(CH$_3$)(OCH$_3$)$_2$,
cyclo-C$_6$H$_{11}$NH(CH$_2$)$_3$—Si(OC$_2$H$_5$)$_2$—O—Si(CH$_3$)(OC$_2$H$_5$)$_2$,
cyclo-C$_6$H$_{11}$NH(CH$_2$)$_3$—Si(OCH$_3$)(CH$_3$)—O—Si(CH$_3$)(OCH$_3$)$_2$,
cyclo-C$_6$H$_{11}$NH(CH$_2$)$_3$—Si(OCH$_3$)(CH$_3$)—O—Si(OCH$_3$)$_3$ and cyclo-C$_6$H$_{11}$NH(CH$_2$)$_3$—Si(OC$_2$H$_5$)(CH$_3$)—O—Si(OCH$_3$)$_3$,
H$_2$N(CH$_2$)$_3$—Si(OCH$_3$)$_2$—(O—Si(CH$_3$)$_2$)$_{1-100}$—O—Si(OCH$_3$)$_2$—(CH$_2$)$_3$NH$_2$,
H$_2$N(CH$_2$)$_3$—Si(OCH$_2$CH$_3$)$_2$—(O—Si(OCH$_2$CH$_3$)$_2$)$_{1-100}$—(O—Si(OCH$_2$CH$_3$)(CH$_2$)$_3$NH$_2$)$_{1-100}$—O—Si(CH$_2$CH$_3$)$_2$—(CH$_2$)$_3$NH$_2$,
Si(OCH$_2$CH$_3$)$_3$—(O—Si(OCH$_2$CH$_3$)$_2$)$_{1-100}$—(O—Si(OCH$_2$CH$_3$)(CH$_2$)$_3$NH$_2$)$_{1-100}$—O—Si(OCH$_2$CH$_3$)$_3$,
H$_2$N(CH$_2$)$_2$NH(CH$_2$)$_3$—Si(OCH$_3$)$_2$—(O—Si(CH$_3$)$_2$)$_{1-100}$—O—Si(OCH$_3$)$_2$—(CH$_2$)$_3$NH(CH$_2$)$_2$NH$_2$,
H$_2$N(CH$_2$)$_2$NH(CH$_2$)$_3$—Si(OCH$_3$)$_2$—(O—Si(CH$_3$)$_2$)$_{1-100}$—(O—Si(OCH$_3$)(CH$_2$)$_3$—NH(CH$_2$)$_2$NH$_2$)$_{1-100}$—O—Si(OCH$_3$)$_2$—(CH$_2$)$_3$NH(CH$_2$NH$_2$,
HO—Si(CH$_3$)$_2$—(O—Si(CH$_3$)$_2$)$_{1-100}$—(O—Si(OCH$_3$)(CH$_2$)$_3$NH(CH$_2$)$_2$NH$_2$)$_{1-100}$—O—Si(CH$_3$)$_2$—OH and
cyclo-C$_6$H$_{11}$NH(CH$_2$)$_3$—Si(OCH$_3$)$_2$—(O—Si(CH$_3$)$_2$)$_{1-100}$—O—Si(OCH$_3$)$_2$—(CH$_2$)$_3$NH-cyclo-C$_6$H$_{11}$
and also the partial hydrolysates therof and compounds which can be prepared by equilibration reactions with compounds comprising Si—O—Si, particular preference being given to H$_2$N(CH$_2$)$_3$—Si(OC$_2$H$_5$)$_2$—O—Si(CH$_3$)(OC$_2$H$_5$)$_2$, H$_2$N(CH$_2$)$_3$—Si(OCH$_2$CH$_3$)$_2$—(O—Si(OCH$_2$CH$_3$)$_2$)$_{1-100}$—(O—Si(OCH$_2$CH$_3$)(CH$_2$)$_3$NH$_2$)$_{1-100}$—O—Si(OCH$_2$CH$_3$)$_2$—(CH$_2$)$_3$NH$_2$, and H$_2$N(CH$_2$)$_2$NH(CH$_2$)$_3$—Si(OCH$_3$)$_2$—(O—Si(CH$_3$)$_2$)$_{1-100}$—(O—Si(OCH$_3$)(CH$_2$)$_3$NH(CH$_2$)$_2$NH$_2$)$_{1-100}$—O—Si(OCH$_3$)$_2$—(CH$_2$)$_3$NH(CH$_2$)$_2$NH$_2$.

Organosilicon compounds of units of the formula (V) are commercially available products or can be prepared according to processes common in silicon chemistry.

Examples of amines of the formula (IV) are cyclohexylamine, triethylamine, trioctylamine, butylamine, dodecylamine, diethyl(n-propyl)amine, cyclohexylmethylamine, 2-aminoethanol, 2-amino-n-propanol, 2-amino-2-methyl-1-propanol, 2-dimethylamino-2-methyl-1-propanol, N,N-diethylethanolamine, ethylenediamine, coconut fatty amine, coconut fatty methylamine, N,N-dimethylethanolamine and aniline.

The optional component(s) (D) preferably are organosilicon compounds of units of the formula (V).

For the preparation of the composition according to the invention, component (D) is preferably used in such an amount that the content of basic nitrogen is preferably from 0.01 to 5 parts by weight, more preferably from 0.01 to 1 part by weight, and especially from 0.04 to 0.5 part by weight, in each case based on 100 parts by weight of organosilicon compound (A).

In addition to the components (A), (B), (C) and (D) described above, the compositions according to the invention can contain any additional substances useful in compositions which can be crosslinked by a condensation reaction, such as catalysts (E), plasticizers (F), fillers (G), adhesion promoters (H) and additives (I).

Examples of catalysts (E) are all catalysts which are useful in compositions which can be crosslinked by a condensation reaction. Examples of catalysts (E) are titanium compounds, and organotin compounds such as di(n-butyl)tin dilaurate and di(n-butyl)tin diacetate, di(n-butyl)tin oxide, dioctyltin diacetate, dioctyltin dilaurate, dioctyltin oxide and reaction products of these compounds with alkoxysilanes such as tetraethoxysilane, di(n-butyl)tin diacetate and dibutyltin oxide in tetraethyl silicate hydrolysate being preferred and di(n-butyl) tin oxide in tetraethyl silicate hydrolysate being particularly preferred.

If the compositions contain a catalyst (E), preferably amounts from 0.01 to 3 parts by weight, more preferably from 0.05 to 2 parts by weight, in each case based on 100 parts by weight of constituent (A), are used.

Examples of plasticizers (F) are dimethylpolysiloxanes end-blocked by trimethylsiloxy groups which are liquid at ambient temperature, in particular with viscosities at 25° C. in the range between 50 and 1000 mPa·s, and also high boiling point hydrocarbons, such as, for example, paraffin oils or mineral oils consisting of naphthene and paraffin units. The compositions preferably contain plasticizers (F) in amounts from 0 to 300 parts by weight, more preferably from 10 to 200 parts by weight, and in particular from 20 to 100 parts by weight, in each case based on 100 parts by weight of organopolysiloxane (A).

Examples of fillers (G) are nonreinforcing fillers, thus fillers with a BET surface of up to 50 $m^2/g$, such as quartz, diatomaceous earth, calcium silicate, zirconium silicate, zeolites, metal oxide powders, such as aluminum, titanium, iron or zinc oxides or the mixed oxides thereof, barium sulfate, calcium carbonate, gypsum, silicon nitride, silicon carbide, boron nitride, glass, and plastic powders such as polyacrylonitrile powder; reinforcing fillers, thus fillers with a BET surface of more than 50 $m^2/g$, such as pyrogenic silica, precipitated silica, precipitated calcium carbonate, carbon black such as furnace black and acetylene black, and silicon/aluminum mixed oxides with a large BET surface; fibrous fillers, such as asbestos, and also plastic fibers. The fillers mentioned can be rendered hydrophobic, for example by treatment with organosilanes or organosiloxanes or with stearic acid or by etherification of hydroxyl groups to give alkoxy groups. If fillers (G) are used, they are preferably hydrophilic pyrogenic silica and precipitated or ground calcium carbonate. The compositions preferably contain fillers (G) in amounts from 0 to 300 parts by weight, more preferably from 1 to 200 parts by weight, and in particular from 5 to 200 parts by weight, in each case based on 100 parts by weight of organopolysiloxane (A).

Examples of adhesion promoters (H) are silanes and organopolysiloxanes with functional groups for example, those with glycidoxypropyl or methacryloyloxypropyl radicals and also tetraalkoxysilanes and siloxanes comprising T or Q groups which may, if appropriate, be alkoxy groups. If, however, another component, such as, for example, siloxane (A) or crosslinking agent (C) or amine (D), already exhibits the functional groups mentioned, the addition of adhesion promoter may be dispensed with. The compositions preferably contain adhesion promoters (H) in amounts from 0 to 50 parts by weight, more preferably from 1 to 20 parts by weight, and in particular from 1 to 10 parts by weight, in each case based on 100 parts by weight of organosilicon compounds (A).

Examples of additives (I) are pigments, dyes, fragrances, oxidation inhibitors, agents for influencing the electrical properties, such as conductive blacks, flame retardants, light stabilizers, agents for extending the skinning time, such as silanes with an SiC-bonded mercaptoalkyl radicals, cell-generating agents, e.g. azodicarbonamide, heat stabilizers, scavengers, such as Si—N-comprising silazanes or silylamides, cocatalysts, such as Lewis and Brönsted acids, e.g. sulfonic acids, phosphoric acids, phosphoric acid esters, phosphonic acids and phosphonic acid esters, and thixotropic agents, such as, for example, phosphoric acid esters or polyglycols, and organic solvents, such as alkylaromatic compounds. The compositions preferably contain additives (I) in amounts from 0 to 100 parts by weight, more preferably from 0 to 30 parts by weight, and in particular from 0 to 10 parts by weight, in each case based on 100 parts by weight of organosilicon compound (A).

The inventive compositions are most preferably those which can be prepared using (A) organosilicon compounds comprising units of the formula (I), (B) encapsulated biocides, if appropriate (C) crosslinking agents of the formula (III), if appropriate (D) compounds bearing basic nitrogen, if appropriate (E) catalyst, if appropriate (F) plasticizers, if appropriate (G) fillers, if appropriate (H) adhesion promoters and if appropriate (I) additives, no additional components being used.

The compositions according to the invention are preferably viscous to pasty compositions.

All constituents can be mixed with one another in any sequence for the preparation of the compositions according to the invention. This mixing can be carried out at ambient temperature and atmospheric pressure, thus approximately from 900 to 1100 hPa. If desired, this mixing can, however, also be carried out at higher temperatures, e.g. at temperatures in the range from 35° C. to 135° C. Furthermore, it is possible, temporarily or continuously, to mix under reduced pressure, such as, e.g., at from 30 to 500 hPa absolute pressure, in order to remove volatile compounds or air.

Individual constituents of the compositions according to the invention can in each case be one type of such a constituent as well as a mixture of at least two different types of such constituents.

The usual water content of the air is sufficient for the crosslinking of the compositions. Crosslinking is preferably carried out at ambient temperature. It can, if desired, also be carried out at higher or lower temperatures than ambient temperature, e.g. at from −5° to 15° C. or at from 30° to 50° C. and/or by means of water concentrations exceeding the normal water content of the air. Preferably, the crosslinking is carried out at a pressure from 100 to 1100 hPa, in particular at atmospheric pressure, thus approximately from 900 to 1100 hPa.

The present invention is also directed to molded articles prepared by crosslinking the compositions of the invention, which can be used for all purposes for which compositions which are storable with the exclusion of water and which crosslink on admission of water at ambient temperature to give elastomers can be used. The compositions are accordingly excellently suitable, for example, as sealants for joints, including vertical joints, and similar empty spaces from, e.g., 10 to 40 mm in width, e.g. of buildings, land vehicles, watercraft and aircraft, or as adhesives or putties, e.g. in the construction of windows or in the manufacture of glass cabinets, and also, e.g., for the preparation of protective coatings, including those for surfaces exposed to the constant action of fresh or seawater, for antislip coatings, for elastomeric molded articles, and also for the insulation of electrical or electronic equipment.

The inventive compositions have the advantage that they are easy to prepare, are free of observable defects, and simultaneously exhibit biocidal action over an extremely long period of time. Furthermore, the compositions have the advantage that, through the provision of encapsulated biocide, the tendency to discolor, both of the as yet uncured compositions as well as the cured molded articles, is extremely low. The crosslinkable compositions also have the advantage that they are distinguished by a very high storage stability and a high crosslinking rate.

In the examples described below, all viscosity data refer to a temperature of 25° C. Unless otherwise stated, the following examples are carried out at atmospheric pressure, thus approximately at 1000 hPa, and at ambient temperature, thus at approximately 23° C., or at a temperature which is established while mixing the reactants at ambient temperature without additional heating or cooling, and at a relative humidity of approximately 50%. Furthermore, all data for parts and percentages, insofar as not otherwise stated, refer to parts by weight.

Preparation of the Fungicidal Composition 1

An aqueous dispersion of microencapsulated 2-(n-octyl)-4-isothiazolin-3-one (OIT) (available commercially under the term "Acticide® OTW" from Thor GmbH) was spray dried. 6 g of the encapsulated and dried OIT thus obtained, with an active substance content of 65%, are dispersed in 14 g of a polydimethylsiloxane end-blocked by trimethylsilyl groups, with a viscosity of 1000 mPa·s. For this, the constituents were mixed with a spatula and subsequently homogenized in a Hauschild mixer at 3000 revolutions/min for 30 seconds.

EXAMPLE 1

330 g of a polydimethylsiloxane mixture, in which the siloxanes are terminated with dimethoxymethylsilyl and/or dimethoxyvinylsilyl groups and the ratio of dimethoxymethylsilyl end groups to dimethoxyvinylsilyl end groups is approximately 1:1, and having a viscosity of 80,000 mPa·s, 265 g of a polydimethylsiloxane end-blocked by trimethylsilyl groups and having a viscosity of 1000 mPa·s, 14 g of methyltrimethoxysilane, 12.5 g of an adhesion promoter, prepared by reaction of 1 part of aminopropyltriethoxysilane with 1 part of methyltriethoxysilane hydrolysate with an ethoxy content of 37%, and 4.5 g of aminopropyltrimethoxysilane are mixed together in a planetary mixer and stirred for 15 minutes. The batch is subsequently brought to completion by homogeneously mixing in 63 g of pyrogenic silica with a specific surface area of 150 m²/g (available commercially under the brand HDK® V15 from Wacker Chemie AG), 1.1 g of octylphosphonic acid, 1.4 g of a polyethylene glycol/polypropylene glycol copolymer with a viscosity of 700 mPa·s, 2.5 g of a tin catalyst, prepared by reaction of di(n-butyl)tin diacetate and tetraethoxysilane, and 3.6 g of the fungicide composition 1 described above (corresponding to 1000 ppm of active substance, based on the total weight of the composition). Finally, the air which has been mixed in is removed by stirring at approximately 100 hPa for 5 minutes.

The composition thus obtained was charged to an aluminum tube, subjected to an airtight seal and stored at ambient temperature for 4 months. The test sample was subsequently applied in a thickness of 2 mm to a PE sheet and stored at 23° C./50% relative humidity. The test sample showed a normal curing behavior and not the slightest discoloring.

The cured rubber showed a good fungicidal action against all types of fungi stipulated in ISO 846, both after curing for 14 days, and after curing for 14 days subsequently storing for 4 weeks in a waterbath with water changed daily and finally storing for 28 days at ambient temperature.

COMPARATIVE EXAMPLE 1

A composition was prepared as described in example 1 with the exception that, instead of the 1000 ppm of encapsulated OIT composition, 1000 ppm of OIT were added as a 10% solution in dodecylbenzene.

After storing at ambient temperature for 4 months, the composition had turned deeply yellow. The cured rubber showed no fungicidal action against any of the types of fungi stipulated in ISO 846.

EXAMPLE 2

300 g of a polydimethylsiloxane with hydroxydimethylsilyl end groups and a viscosity of 80,000 mPa·s, 200 g of a polydimethylsiloxane end-blocked by trimethylsilyl groups with a viscosity of 1000 mPa·s, 38.5 g of methyltris(methylethylketoximo)silane and 7.0 g of vinyltris(methylethylketoximo)silane are mixed with one another in a planetary mixer and stirred for 10 minutes, then 8.3 g of an adhesion promoter, prepared by reaction of 2 parts of aminoethylaminopropyltrimethoxysilane with 3 parts of polydimethylsiloxane, with a viscosity of approximately 75 mPa·s, are added and the mixture is stirred for a further 3 minutes. The batch is subsequently brought to completion by homogeneously mixing in 48 g of pyrogenic silica with a specific surface area of 150 m²/g (available commercially under the brand HDK® V15 from Wacker Chemie AG), 400 g of a ground and surface-coated calcium carbonate with a mean particle diameter of 5.7 μm (available commercially from Omya GmbH, Cologne, Germany, under the description "Omya BLR 3"), 5.0 g of the fungicide composition 1 described above and 0.9 g of di(n-butyl)tin diacetate. Finally, the air incorporated during mixing is removed by stirring at approximately 100 hPa for 5 minutes.

The composition thus obtained was charged to an aluminum tube, subjected to an airtight seal and stored at ambient temperature for 4 months. The test sample was subsequently applied in a thickness of 2 mm to a PE sheet and stored at 23° C./50% relative humidity. The test sample showed a normal curing behavior and not the slightest discoloring.

The cured rubber showed a good fungicidal action against all types of fungi stipulated in ISO 846, both after curing for 14 days, and after curing for 14 days and subsequently storing for 4 weeks in a waterbath with water changed daily and finally storing for 28 days at ambient temperature.

COMPARATIVE EXAMPLE 2

A substance was prepared as described in example 2 with the exception that, instead of the 1000 ppm of encapsulated OIT composition, 1000 ppm of OIT were added as a 10% solution in dodecylbenzene.

After storing at ambient temperature for 4 months, the substance had turned deeply yellow. The cured rubber showed no fungicidal action against any of the types of fungi stipulated in ISO 846.

While embodiments of the invention have been illustrated and described, it is not intended that these embodiments

What is claimed is:

1. A crosslinkable viscous to pasty composition based on organosilicon compounds which can be crosslinked by a condensation reaction, comprising:
   (A) at least one organosilicon compound with at least two condensable groups,
   (B) at least one encapsulated biocide,
   (C) optionally, one or more crosslinking agents, and
   (D) compounds bearing basic nitrogen,
wherein at least one biocide of component (B) is 2-(n-octyl)-4-isothiazolin-3-one (OIT) or 4,5-dichloro-2-(n-octyl)-4-isothiazolin-3-one (DCOIT), the biocide(s) being present in the encapsulated biocide in an amount of from 40% to 80% by weight based on the weight of the encapsulated biocide, wherein after storage of four months, the composition has not yellowed as determined by visual observation.

2. The crosslinkable composition of claim 1, wherein the organosilicon compounds (A) comprise units of the formula $$R_a(OR^1)_bY_cSiO_{(4-a-b-c)/2} \quad (I),$$

in which
   R are identical or different and are optionally substituted hydrocarbon radicals optionally interrupted by oxygen atoms,
   $R^1$ are identical or different and are hydrogen or monovalent optionally substituted hydrocarbon radicals optionally interrupted by oxygen atoms,
   Y are identical or different and are a halogen atom, a pseudohalogen radical, an Si—N-bonded amine radical, an amide radical, an oxime radical, or an aminoxy radical,
   a iso, 1, 2 or 3,
   b is 0, 1, 2 or 3 and
   c is 0, 1, 2 or 3,
   with the proviso that the sum of a+b+c is less than or equal to 4 and at least two condensable radicals ($OR^1$) are present per molecule.

3. The crosslinkable composition of claim 1, wherein component (B) is a dry powder.

4. The crosslinkable composition of claim 1, wherein component (B) is present in an amount of from 0.01 to 3 parts by weight, based on 100 parts by weight of organosilicon compound (A).

5. The crosslinkable composition of claim 1, wherein component (D) is present in an amount such that the content of basic nitrogen is from 0.01 to 5 parts by weight, based on 100 parts by weight of organosilicon compound (A).

6. A molded article, prepared by crosslinking the composition of claim 1.

7. A molded article, prepared by crosslinking the composition of claim 2.

8. A molded article, prepared by crosslinking the composition of claim 3.

9. A molded article, prepared by crosslinking the composition of claim 4.

10. A molded article, prepared by crosslinking the composition of claim 5.

11. The composition of claim 1, wherein the compound bearing basic nitrogen is selected from the group consisting of $$NR^6_3 \quad (IV),$$

in which $R^6$ are identical or different and are a hydrogen atom or hydrocarbon radical optionally substituted by hydroxyl groups, halogen atoms, amino groups, ether groups, ester groups, epoxy groups, mercapto groups, cyano groups or (poly)glycol radicals, the latter being formed from oxyethylene and/or oxypropylene units,
with the proviso that, in formula (IV), at most two $R^6$ are a hydrogen atom,
cyclic aliphatic amines, such as, for example, piperidine and morpholine,
and also organosilicon compounds with at least one organic radical exhibiting basic nitrogen of units of formula $$R^7_kA_lSi(OR^8)_mO_{(4-k-l-m)/2} \quad (V),$$

in which
   $R^7$ are identical or different and are monovalent SiC-bonded organic radicals which do not contain basic nitrogen,
   $R^8$ are identical or different and have the meaning given for radical $R^1$,
   $R^1$ are identical or different and are hydrogen or monovalent optionally substituted hydrocarbon radicals optionally interrupted by oxygen atoms,
   A are identical or different and represent a monovalent SiC-bonded radical bearing basic nitrogen,
   k is 0, 1, 2 or 3,
   l is 0, 1, 2, 3 or 4 and
   m is 0, 1, 2 or 3,
   with the proviso that the sum of k+l+m is less than or equal to 4 and at least one radical A is present per molecule, and mixtures thereof.

12. The composition of claim 11, wherein the compound bearing basic nitrogen has at least one group $NH_2$.

13. The composition of claim 1, wherein the compound bearing basic nitrogen is selected from the group consisting of $H_2NCH_2$—, $H_2N(CH_2)_2$—, $H_2N(CH_2)_3$—, $H_2N(CH_2)_2NH(CH_2)_2$—, $H_2N(CH_2)_2NH(CH_2)_3$—, $H_2N(CH_2)_2NH(CH_2)_2NH(CH_2)_3$—, $H_3CNH(CH_2)_3$—, $C_2H_5NH(CH_2)_3$—, $H_3CNH(CH_2)_2$—, $C_2H_5NH(CH_2)_2$—, $H_2N(CH_2)_4$—, $H_2N(CH_2)_5$—, $H(NHCH_2CH_2)_3$—, $C_4H_9NH(CH_2)_2NH(CH_2)_2$—, cyclo-$C_6H_{11}NH(CH_2)_3$—, cyclo-$C_6H_{11}NH(CH_2)_2$—, $(CH_3)_2N(CH_2)_3$—, $(CH_3)_2N(CH_2)_2$—, $(C_2H_5)_2N(CH_2)_3$— and $(C_2H_5)_2N(CH_2)_2$—, $H_2N(CH_2)_3$—Si$(OCH_3)_3$, $H_2N(CH_2)_3$—Si$(OC_2H_5)_3$, $H_2N(CH_2)_3$—Si$(OCH_3)_2CH_3$, $H_2N(CH_2)_3$—Si$(OC_2H_5)_2CH_3$, $H_2N(CH_2)_2NH(CH_2)_3$—Si$(OCH_3)_3$, $H_2N(CH_2)_2NH(CH_2)_3$—Si$(OC_2H_5)_3$, $H_2N(CH_2)_2NH(CH_2)_3$—Si$(OCH_3)_2CH_3$, $H_2N(CH_2)_2NH(CH_2)_3$—Si$(OC_2H_5)_2CH_3$, $H_2N(CH_2)_2NH(CH_2)_3$—Si$(OH)_3$, $H_2N(CH_2)_2NH(CH_2)_3$—Si$(OH)_2CH_3$, $H_2N(CH_2)_2NH(CH_2)_2NH(CH_2)_3$—Si$(OCH_3)_3$, $H_2N(CH_2)_2NH(CH_2)_2NH(CH_2)_3Si(OC_2H_5)_3$, cyclo-$C_6H_{11}NH(CH_2)_3$—Si$(OCH_3)_3$, cyclo-$C_6H_{11}NH(CH_2)_3$—Si$(OC_2H_5)_3$, cyclo-$C_6H_{11}NH(CH_2)_3$—Si$(OCH_3)_2CH_3$, cyclo-$C_6H_{11}NH(CH_2)_3$—Si$(OC_2H_5)_2CH_3$, cyclo-$C_6H_{11}NH(CH_2)_3$—Si$(OH)_3$, cyclo-$C_6H_{11}NH(CH_2)_3$—Si$(OH)_2CH_3$, HN$((CH_2)_3$—Si$(OCH_3)_3)_2$ and HN$((CH_2)_3$—Si$(OC_2H_5)_3)_2$ and also the partial hydrolysates thereof, $H_2N(CH_2)_3$—Si$(OCH_3)_2$—O—Si$(CH_3)(OCH_3)_2$, $H_2N(CH_2)_3$—Si$(OC_2H_5)_2$—O—Si$(CH_3)(OCH_3)_2$, $H_2N(CH_2)_3$—Si$(OC_2H_5)_2$—O—Si$(CH_3)(OC_2H_5)_2$, $H_2N(CH_2)_3$—Si$(OCH_3)(CH_3)$—O—Si$(CH_3)(OCH_3)_2$, $H_2N(CH_2)_3$—Si$(OCH_3)(CH_3)$—O—Si$(OCH_3)_3$, $H_2N(CH_2)_3$—Si$(OC_2H_5)(CH_3)$—O—Si$(OCH_3)_3$, $H_2N(CH_2)_2NH(CH_2)_3$—Si$(OCH_3)_2$—O—Si$(CH_3)(OCH_3)_2$, $H_2N(CH_2)_2NH(CH_2)_3$—Si$(OC_2H_5)_2$—O—Si$(CH_3)(OCH_3)_2$, $H_2N(CH_2)_2NH(CH_2)_3$—Si$(OC_2H_5)_2$—O—Si$(CH_3)(OC_2H_5)_2$, $H_2N(CH_2)_2NH(CH_2)_3$—Si$(OCH_3)(CH_3)$—O—Si$(CH_3)(OCH_3)_2$, $H_2N$ $(CH_2)_2NH(CH_2)_3-Si(OCH_3)(CH_3)-O-Si(OCH_3)_3$, $H_2N(CH_2)_2NH(CH_2)_3-Si(OC_2H_5)(CH_3)-O-Si(OCH_3)_3$, cyclo-$C_6H_{11}NH(CH_2)_3-Si(OCH_3)_2-O-Si(CH_3)(OCH_3)_2$, cyclo-$C_6H_{11}NH(CH_2)_3-Si(OC_2H_5)_2-O-Si(CH_3)(OCH_3)_2$, cyclo-$C_6H_{11}NH(CH_2)_3-Si(OC_2H_5)_2-O-Si(CH_3)(OC_2H_5)_2$, cyclo-$C_6H_{11}NH(CH_2)_3-Si(OCH_3)(CH_3)-O-Si(CH_3)(OCH_3)_2$, cyclo-$C_6H_{11}NH(CH_2)_3-Si(OCH_3)(CH_3)-O-Si(OCH_3)_3$ and cyclo-$C_6H_{11}NH(CH_2)_3-Si(OC_2H_5)(CH_3)-O-Si(OCH_3)_3$, $H_2N(CH_2)_3-Si(OCH_3)_2-(O-Si(CH_3)_2)_{1-100}-Si(OCH_3)_2-(CH_2)_3NH_2$, $H_2N(CH_2)_3-Si(OCH_2CH_3)_2-(O-Si(OCH_2CH_3)_2)_{1-100}-(O-Si(OCH_2CH_3)(CH_2)_3NH_2)_{1-100}-O-Si(CH_2CH_3)_2-(CH_2)_3NH_2$, $Si(OCH_2CH_3)_3-(O-Si(OCH_2CH_3)_2)_{1-100}-(O-Si(OCH_2CH_3)(CH_2)_3NH_2)_{1-100}-O-Si(OCH_2CH_3)_3$, $H_2N(CH_2)_2NH(CH_2)_3-Si(OCH_3)_2-(O-Si(CH_3)_2)_{1-100}-O-Si(OCH_3)_2-(CH_2)_3-NH(CH_2)_2NH_2$, $H_2N(CH_2)_2NH(CH_2)_3-Si(OCH_3)_2-(O-Si(CH_3)_2)_{1-100}(O-Si(OCH_3)(CH_2)_3-NH(CH_2)_2NH_2)_{1-100}-O-Si(OCH_3)_2-(CH_2)_3NH(CH_2)_2NH_2$, $HO-Si(CH_3)_2-(O-Si(CH_3)_2)_{1-100}-(O-Si(OCH_3)(CH_2)_3NH(CH_2)_2NH_2)_{1-100}-O-Si(CH_3)_2-OH$ and cyclo-$C_6R_1NH(CH_2)_3-Si(OCH_3)_2-(O-Si(CH_3)_2)_{1-100}-O-Si(OCH_3)_2-(CH_2)_3NH-$ cyclo-$C_6H_{11}$ and also the partial hydrolysates thereof and compounds which can be prepared by equilibration reactions with compounds comprising Si—O—Si; cyclohexylamine, triethylamine, trioctylamine, butylamine, dodecylamine, diethyl(n-propyl)amine, cyclohexylmethylamine, 2-aminoethanol, 2-amino-n-propanol, 2-amino-2-methyl-1-propanol, 2-dimethylamino-2-methyl-1-propanol, N,N-diethylethanolamine, ethylenediamine, coconut fatty amine, coconut fatty methylamine, N,N-dimethylethanolamine, aniline;

and mixtures of these compounds bearing basic nitrogen.

14. The composition of claim 1, wherein a compound bearing basic nitrogen is selected from the group consisting of compounds of the formula (V)

$R^7{}_k A_l Si(OR^8)_m O_{(4-k-l-m)/2}$ (V), in which

R$^7$ are identical or different and are monovalent SiC-bonded organic radicals which do not contain basic nitrogen, R$^8$ are identical or different and have the meaning given for radical R$^1$, R$^1$ are identical or different and are hydrogen or monovalent optionally substituted hydrocarbon radicals optionally interrupted by oxygen atoms, A are identical or different and represent a monovalent SiC-bonded radical with basic nitrogen, k is 0, 1, or 2, l is 1 or 2, m is 1, 2, or 3, and with the proviso that the sum of k+l+m is equal to 4.

15. The composition of claim 14, wherein k is 0 or 1, l is 1, and m is 2 or 3.

16. The composition of claim 1, wherein a compound bearing basic nitrogen contains a primary alkylamino group.

17. The composition of claim 1, wherein the sole organic biocides present in the composition are selected from the group consisting of 4,5-dichloro-2-(n-octyl)-4-isothiazolin-3-one (DCOIT), 2-(n-octyl)-4-isothiazolin-3-one (OIT) and mixtures thereof.

18. A non-yellowing crosslinkable viscous to pasty composition based on organosilicon compounds which can be crosslinked by a condensation reaction, comprising:

(A) at least one organosilicon compound with at least two condensable groups, (B) a biocide component selected from the group consisting of encapsulated OIT, encapsulated DCOIT, and mixtures thereof as encapsulated biocides, wherein the biocide present in the encapsulated biocides constitutes 40-80 weight percent of encapsulated biocide, (C) optionally, one or more crosslinking agents, and (D) compounds bearing basic nitrogen, wherein after storage of four months, the composition has not yellowed as determined by visual observation.

19. A molded article, prepared by crosslinking the composition of claim 15.

* * * * *

UNITED STATES PATENT AND TRADEMARK OFFICE
CERTIFICATE OF CORRECTION

PATENT NO.       : 8,183,307 B2
APPLICATION NO.  : 11/782711
DATED            : May 22, 2012
INVENTOR(S)      : Marko Prasse It is certified that error appears in the above-identified patent and that said Letters Patent is hereby corrected as shown below:

Column 16, Line 38, Claim 19:

After "the composition of claim" delete "15" and insert -- 11 --.

Signed and Sealed this
Eighteenth Day of September, 2012

David J. Kappos
*Director of the United States Patent and Trademark Office*